Feb. 11, 1936. J. G. HEASLET 2,030,587
TUBER HARVESTER
Filed Nov. 19, 1934
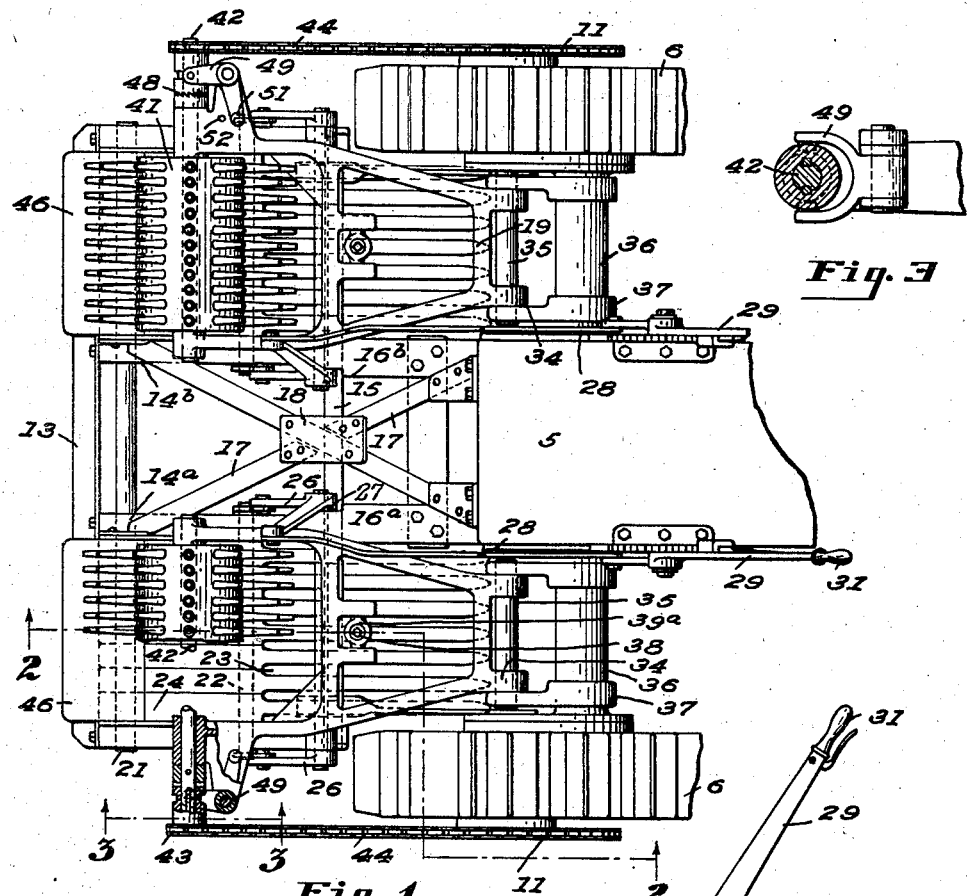
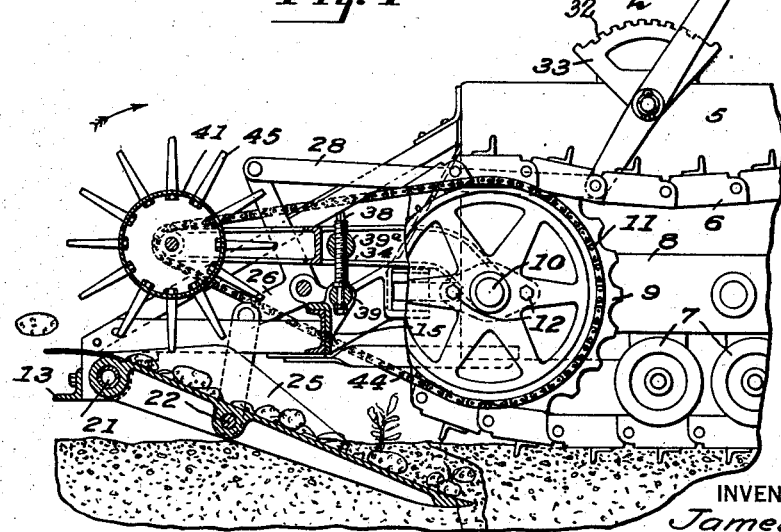
INVENTOR
James G. Heaslet
BY
George Douglas Jones
ATTORNEY Patented Feb. 11, 1936

2,030,587

UNITED STATES PATENT OFFICE 2,030,587

TUBER HARVESTER

James G. Heaslet, Cleveland, Ohio, assignor to The Cleveland Tractor Company, Cuyahoga County, Ohio Application November 19, 1934, Serial No. 753,602

11 Claims. (Cl. 55—9)

This invention relates to a harvesting machine and, more especially, to a tuber digger or harvester.

The harvesting of tubers has been, and is, an expensive operation, as the conventional machine or implement used in this work is costly, both from the initial investment as well as the upkeep. This latter cost during the harvesting season, lasting only a few weeks, at times reaches 50% of the initial cost of the equipment which, obviously, greatly increases the production cost of producing tubers.

The present invention has for its purpose the production of a tuber harvester which is simple in construction, economical in operation and of low initial cost, and so designed as to become an integral part of a track laying tractor.

Not alone are the present tuber harvesters costly and extremely complicated, they are also extremely inefficient. The separation of the tubers from the earth varies anywhere from 75% to 90%, thus, burying or hiding a portion of the crop to the loss of the producer.

An object, therefore, of this invention is to provide a tuber harvester having a very high percentage of separation.

A further object of this invention is to provide the harvester with integral digger and conveyor members.

Fig. 1 is a top plan view of the tuber harvester supported by and carried on a track laying tractor.

Fig. 2 is a side elevation of the rear portion of the tractor and a sectional elevation of the tuber harvester taken on line 2—2 of Fig. 1.

Fig. 3 is a section of a declutching mechanism taken on line 3—3 of Fig. 1.

Referring now to the drawing by numerals of reference, wherein like numerals correspond to like parts, reference numeral 5 is the rear housing of a track laying tractor, numeral 6 is an articulated, endless track supported on rollers 7 which are mounted on the tractor frames 8, the said tracks being driven by sprocket wheels 9 which are mounted on driving axles 10. Removably secured to the tractor drive sprocket wheels 9 are auxiliary sprocket wheels 11 secured to their respective tractor drive sprocket wheels 9 by bolts 12.

To the rear of the tractor is a transverse supporting member 13 secured by means of side brackets 14a and 14b to a channel shaped cross member 15 which, in turn, is rigidly secured to the tractor housing 5 through members 16a and 16b.

The transverse member 13 is also secured to the upper portion of the tractor housing 5 by braces 17. These brace members are preferably placed in the form of an X and are reinforced for rigidity by the gusset plate 18, the ends of the braces 17 being bolted to housing 5.

Digger and conveyor members 19 in the form of a plurality of fingers are positioned on each side of the tractor and are pivotally secured to a shaft 21. These digger and conveyor members or arms 19 are preferably shaped so that when secured together by means of a horizontal tie rod 22, the forward portions of the digger fingers 19 are tapered forming parallel open spaces 23 through which soil may pass while the rearward portions of 19 are widened and abut each other, forming a closed platform or conveyor base 24.

Attached to each of the series of conveyor digger members 19 and preferably on each side thereof are links 25 which are pivoted to the bar 22 at one end and to a bell crank lever 26 at the opposite end. The cranks 26 are mounted on members 27 and are operated by arms 28 which are pivoted to lever arms 29, having pawl handles 31, the pawl (not shown) engages in the quadrant notches 32 which form a part of the quadrant 33, and, in turn, are bolted to the sides of the transmission case of the tractor. Thus, any movement of the hand lever 29 will raise or lower the conveyor assembly and digger fingers to any desired position.

Pivoted fork members 34 are secured to side pins 35 which, in turn, are affixed to the tractor axle housings 36 by means of yokes 37. These U-shaped fork members 34 extend rearwardly from their pivotal connections and are vertically supported by threaded screws 38 which are secured through brackets 39 which, in turn, are rigidly affixed to the channel shaped cross member 15.

The screw members 38 are threaded through a pivoted ball nut 39a centrally secured to the fork 34 which permits the raising or lowering of the U-shaped members 34 when the screws 38 are operated. Between the open end portions of the U-shaped fork members 34 are mounted rotatable drums 41 affixed to axles 42, carrying sprocket wheels 43 and driven by sprocket chains 44. These drums 41 have resilient fingers 45 on their outer peripheries and during the forward travel of the tractor they are revolved in the direction as indicated by the arrow in Fig. 2. A delivery platform 46 is provided and secured to the rear of each conveyor digger. A power clutching and declutching mechanism 47 is provided between the drum sprockets 43 and the drum axles 42, and drives the axles through means of ratchets 48 which are controlled by yokes 49 secured in open position through means of pin 51 inserted through one end of the yoke and registering with holes 52 of the frame 34.

Operation

As the tractor moves forward, the digger fingers plow the earth beneath the tuber and carry the tubers together with the earth upwardly on the conveyor where a portion of the earth sifts through the openings 23 in the conveyor. The continued rearward movement of the tubers and soil brings them in contact with the resilient fingers mounted on the revolving drum. A separation of soil and potatoes is caused by the fingers throwing the tubers rearwardly and permitting the soil to drop from the rear of the conveyor.

It is preferred that the drum having the resilient fingers mounted thereon be operated at a greater speed than the normal traveling speed of the tractor. The speed may be varied by decreasing the pitch diameter of the sprocket wheel 11 or by increasing the pitch diameter of the sprocket wheel 43. The penetration of the earth by the digger conveyors may be varied in order to pick up all of the tubers and it is preferable that these points of the digger fingers be positioned almost directly under the driver's seat, thus permitting complete visibility of the entire operation.

What I claim is:

1. A tuber harvester including a wide tread track-laying tractor, sets of forwardly extending digger fingers pivotally connected to a platform secured to the rear of said tractor, and a rotary pusher mounted adjacent the said platform and adapted to dispose material therefrom.

2. A tuber harvester including a wide tread track-laying type tractor, the said tractor having parallel chassis side frames pivotally secured between parallel articulated tracks, sets of forwardly extending digger fingers pivotally connected to a rearwardly extending platform secured to the rear of said tractor, the said sets of digger fingers contacting with the ground at a point between the said side frames and the articulated tracks.

3. A tuber harvester including a self-propelled vehicle, a rearwardly extending platform attached to said vehicle, a series of digger fingers pivotally connected to said platform, the forward ends of said fingers contacting with the ground adjacent the vehicle, a drum having radial projections thereon mounted above the said platform, the said drum being positively driven and adapted to sweep said platform.

4. In a tuber harvester, a self-propelled track-laying vehicle, a rearwardly extending platform attached to said vehicle, a series of forwardly extending digger fingers affixed to said platform, a rotating drum carrying radial fingers on its periphery mounted above the said platform, the said rotating drum being positively driven and so positioned that the said radial fingers sweep the said platform.

5. A tuber harvester including a platform affixed to the rear of a tractor, sets of forwardly inclined ground-engaging digger fingers pivotally secured to the rearward portion of said platform on opposite sides thereof, and a series of rotary pusher members affixed to a drum adjacent the rear of each set of digger fingers and adapted to move rearwardly the material deposited on the said platform by the inclined diggers.

6. In combination with a crawler type tractor, a tuber harvesting mechanism, said mechanism including sets of forwardly extending digger fingers pivotally connected to a platform secured at the rear of said tractor, said sets of digger fingers being pivotally secured intermediate their ends to a link which is pivoted to a bell-crank, and a hand lever pivotally connected to said bell-crank for raising and lowering the free end of said digger fingers.

7. In combination, a tuber harvester and track-laying tractor, said tractor including a chassis and spaced parallel articulated tracks, a rearwardly extending platform affixed to the rear of said tractor, a series of forwardly extending digger fingers pivoted to the said platform and contacting with the ground between the said tractor chassis and spaced articulated tracks, horizontal drums having radial pins thereon journalled between forks pivotally supported on either side of the tractor chassis, said drums being positively driven and having the radial pins thereon sweeping the said platform.

8. In combination, a tuber harvester and track-laying tractor, said tractor including a chassis and spaced parallel articulated tracks, a rearwardly extending platform affixed to the rear of said tractor, a series of forwardly extending digger fingers pivoted to the said platform and contacting with the ground between the said tractor chassis and spaced articulated tracks, horizontal drums having radial pins thereon journalled between forks pivotally supported on either side of the tractor chassis, said drums being positively driven and having the radial pins thereon sweeping the said platform, and screw shafts affixed to the said platform and threaded through the said pivoted forks for adjusting the said drums in relation to the said platform.

9. A tuber harvester including a self propelled vehicle, a rearwardly extending platform attached to said vehicle, a series of digger fingers pivotally connected to said platform, the forward ends of said fingers contacting with the ground adjacent the vehicle, a positively driven horizontal drum mounted above the rearwardly extending platform, resilient radial fingers projecting from the periphery of the drum and adapted to frictionally engage the solid materials deposited on the platform and selectively project them therefrom.

10. A tuber harvester including a self propelled vehicle, a rearwardly extending platform attached to said vehicle, a series of digger fingers pivotally connected to said platform, the forward ends of said fingers contacting with the ground adjacent the vehicle, a power driven drum having a plurality of resilient fingers affixed to its outer periphery mounted adjacent the said platform, the resilient fingers contacting with solids deposited on the platform by the beforementioned digger fingers, and projecting some portions of the solids therefrom to a greater distance than other portions of the solids.

11. A tuber harvester including a self propelled vehicle, a rearwardly extending platform attached to said vehicle, a series of digger fingers pivotally connected to said platform, the forward ends of said fingers contacting with the ground adjacent the vehicle, a positively driven drum having radial projections thereon mounted above the said platform, said radial projections being resilient and adapted to sweep material deposited on said platform by the digger fingers, the sweeping action of the resilient fingers classifying the material dependent on its specific gravity.

JAMES G. HEASLET.